United States Patent [19]
Suzuki et al.

[11] Patent Number: 6,034,829
[45] Date of Patent: Mar. 7, 2000

[54] DISK DRIVE AND SERVO PATTERN WRITE METHOD FOR PREVENTING READ ERRORS RESULTING FROM A THERMAL ASPERITY WITHIN AN ERASE AREA BETWEEN A SERVO PAD AREA AND A GRAY CODE AREA

[75] Inventors: Hiroaki Suzuki, Fujisawa; Yoshio Yamamoto, Machida; Tatsuya Endo, Fujisawa, all of Japan

[73] Assignee: International Business Machines Corporation, Armonk, N.Y.

[21] Appl. No.: 08/973,301

[22] PCT Filed: Jun. 8, 1995

[86] PCT No.: PCT/JP95/01158

§ 371 Date: Dec. 2, 1997

§ 102(e) Date: Dec. 2, 1997

[87] PCT Pub. No.: WO96/42081

PCT Pub. Date: Dec. 27, 1996

[51] Int. Cl.[7] .................................. G11B 5/02; G11B 5/09
[52] U.S. Cl. .................................. 360/25; 360/48; 360/49
[58] Field of Search .................................. 360/48, 49, 25, 360/78.04, 77.08

[56] References Cited

U.S. PATENT DOCUMENTS

| | | | |
|---|---|---|---|
| 3,860,965 | 1/1975 | Voegeli | 360/113 |
| 5,233,482 | 8/1993 | Galbraith et al. | 360/46 |
| 5,420,736 | 5/1995 | Heim et al. | 360/113 |
| 5,442,499 | 8/1995 | Emori | 360/77.08 |
| 5,760,983 | 6/1998 | Cowen | 360/48 |
| 5,812,338 | 9/1998 | Ogasawara et al. | 360/77.08 |
| 5,815,332 | 9/1998 | Suzuki et al. | 360/48 |

FOREIGN PATENT DOCUMENTS

| | | |
|---|---|---|
| 0348027 | 12/1989 | European Pat. Off. . |
| 0353852 | 2/1990 | European Pat. Off. . |
| 0439299 | 7/1991 | European Pat. Off. . |

*Primary Examiner*—W. Chris Kim
*Attorney, Agent, or Firm*—Matthew J. Bussan

[57] ABSTRACT

In a disk drive which has a magneto-resistance (MR) element as a read element and where servo areas and data areas are separated and recorded on a disk, the disk drive is so constructed as to prevent a read error resulting from the roughness of the disk, i.e, a read error of a thermal asperity. There is provided a structure where, in a servo area, a read error of a start bit of a Gray code is prevented by a thermal asperity which occurs immediately before the Gray code, and where an erase area is detected. In the structure of the present invention, a servo pattern is formed so that a polarity of a start bit signal of a start position of the Gray code, which is detected by said MR element, becomes a polarity opposite to a polarity of a signal that the MR element generates because of the thermal asperity, and also a channel circuit having a hysteresis comparator which alternately reads out signals different in polarity is used so that reading of an error signal resulting from the thermal asperity is not executed. With this, a read error is prevented.

4 Claims, 9 Drawing Sheets

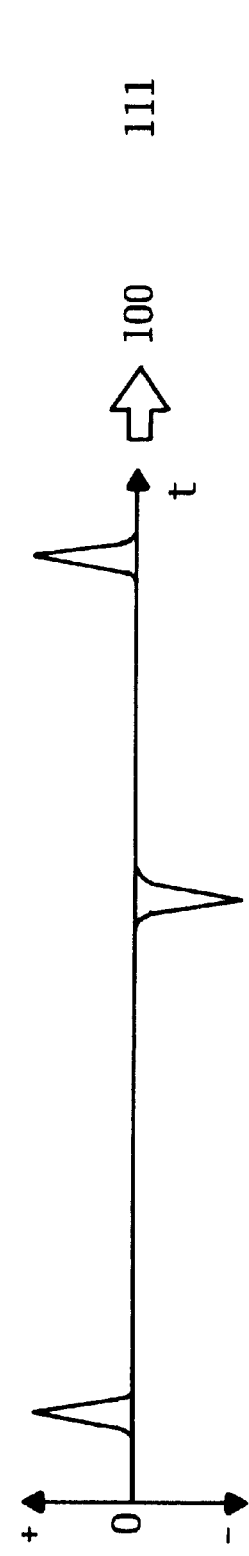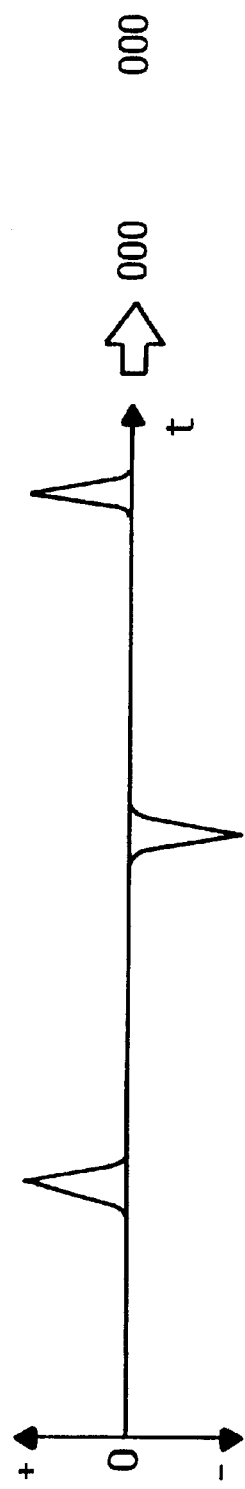

WRITE CURRENT DIRECTION

DISK MAGNETIZATION

READ WAVEFORM

GRAY CODE
GRAY START BIT
ERASE AREA
SERVO PAD

SIGNAL AREA
SERVO GRAY CODE
ERASE AREA
SERVO PAD

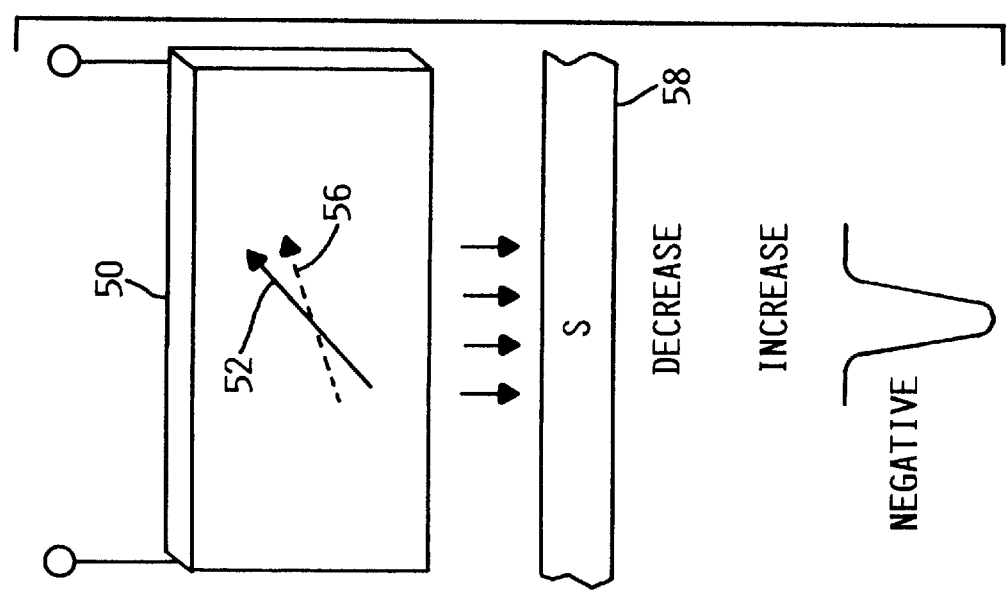
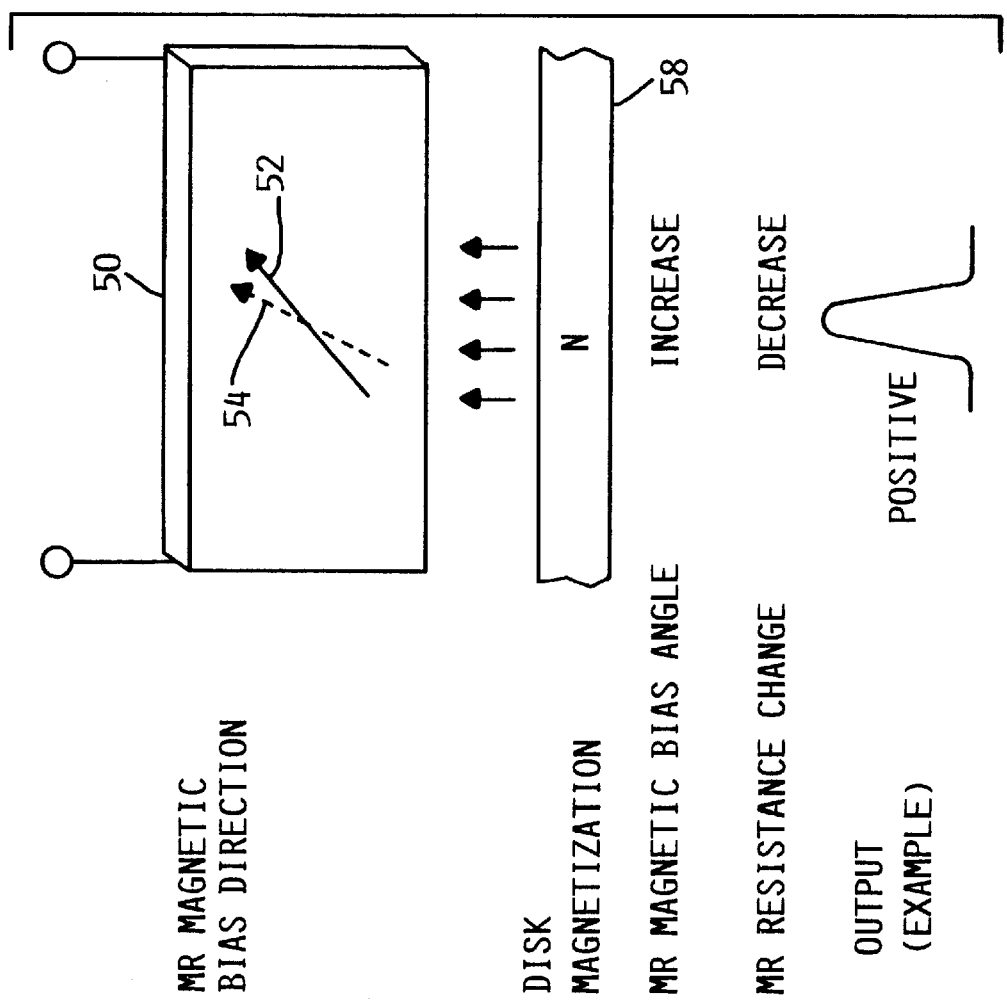
FIG. 8B
FIG. 8A

DISK DRIVE AND SERVO PATTERN WRITE METHOD FOR PREVENTING READ ERRORS RESULTING FROM A THERMAL ASPERITY WITHIN AN ERASE AREA BETWEEN A SERVO PAD AREA AND A GRAY CODE AREA

BACKGROUND OF THE INVENTION

1. Field of the Invention

The present invention relates to the field of the read error processing in magnetic disk drives. More specifically, the invention relates to a method of preventing read errors resulting from the thermal asperity (TA) of the servo area of the disk.

2. Background Information

A magnetic disk drive is a drive which writes data to the disk surface or reads data from the disk surface by a change of magnetization. A converter is positioned over a desired position on the track on which data has been recorded, and data is read out of the track of the disk rotating at high speed, or data is written to the track. The magnetic head of the magnetic disk drive is slightly spaced from the disk surface and positioned over a predetermined track. Magnetoresistive (MR) head has been adopted as one of the (magnetic field) conversion heads. The output resistance of the MR head changes as the magnetic field changes. This resistance change with a predetermined current to pass through the MR element converts MR resistance change to voltage signal, as reading out data.

However, the method of reading out this resistance change has a thermal asperity problem as one of its operational problems. The thermal asperity can be defined as follows. The large asperity of the disk surface touches a magnetic head and crashes, and temperature change causes resistance change to occur in the MR element. Because of this resistance change, an abnormal signal will occur.

The phenomenon of a thermal asperity often causes a strip temperature to rise to more than 100 degrees locally. The cause of this temperature rise is a mechanical crash between the head portion, including the MR stripe, and the asperity of the disk surface. Since the (normal) resistance change of the magnetic head by the magnetization change in the medium (disk), which is caused by normal reading, is less than 1% of the MR stripe resistance, the signal change resulting from the temperature rise, which is caused by the thermal asperity, largely exceeds the resistance change caused by a normal read signal, so normal data reading is hindered.

In conventional methods which cope with the thermal asperity with respect to data that is read out, when a sharp signal change, which would be determined to be a thermal asperity, is read out, an appropriate alternation is added to that read signal so that it can be processed as data, or that read signal is corrected with an error correction code. However, these conventional methods have the disadvantage that external additional hardware is required, or in the case of a large burst error which should be with an error correction code, correction becomes impossible and finally it should be processed as an unreadable hard error. Thus, the conventional methods cannot solve the thermal asperity problem sufficiently.

SUMMARY OF THE INVENTION

The object of the present invention is to provide a disk drive having a structure with which a read error resulting from a thermal asperity is effectively prevented, and provide a method of effectively preventing a read error resulting from a thermal asperity.

The present invention is characterized in that when a thermal asperity appears in servo data which is the head position data on a disk, a read signal resulting from this thermal asperity can be ignored.

The present invention prevents a signal caused by a thermal asperity from being recognized to be the start bit of a Gray code, when the thermal asperity occurs between the servo pad area positioned prior to Erase Area and the Gray code representative of the position of a track/sector on the disk, and also makes it possible to reliably detect an erase area existing between the servo pad area and the start bit of the Gray code. To achieve this, a servo pad signal is written in so that the polarity of the waveform of the end signal of the servo pad area is always identical with the polarity of a waveform caused by the thermal asperity, and at the same time, the start bit representative of the start position of the Gray code is written as the reverse polarity of these waveforms. In the reading of these signals, the peaks of signals opposite in polarity are searched, and signals of alternate polarities are read out with a mode for detecting these, for example, a hysteresis comparator mode. Therefore, when a signal of the same polarity is read out consecutively, this signal results from the thermal asperity and is ignored. With this, a right signal following this thermal asperity can be read out.

BRIEF DESCRIPTION OF THE DRAWINGS

FIGS. 3(a) to 3(c) are a diagram used to explain the Gray code of the magnetic disk;

FIGS. 8(a) and 8(b) are a diagram showing the relationship between the direction of the magnetization of an MR element and the magnetized patter n o f the disk.

DESCRIPTION OF THE PREFERRED EMBODIMENT

Figure 1:
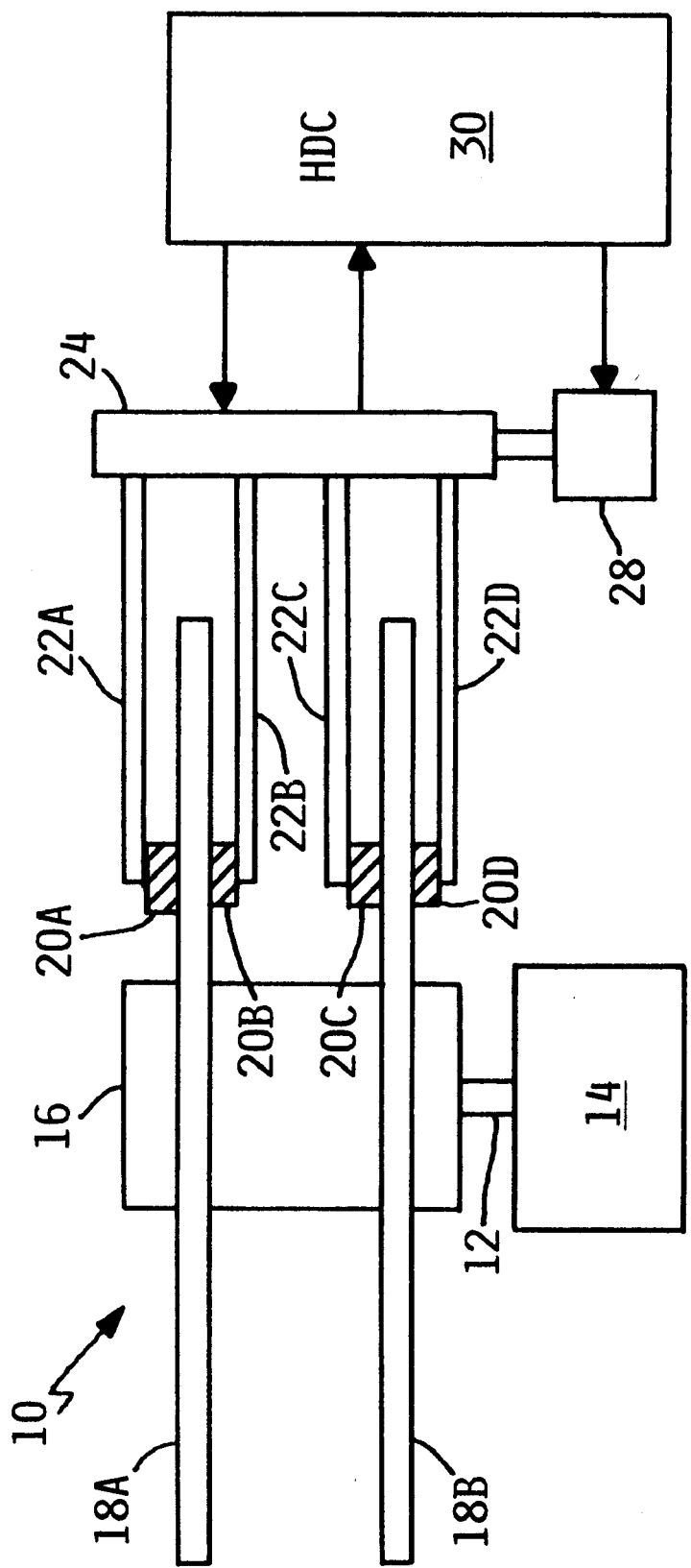
FIG. 1 is a block diagram of a hard-disk drive to which the present invention is applied.

FIG. 1 shows an example of a hard-disk drive (HDD) to which the present invention is applied. As shown in FIG. 1, the HDD 10 comprises a disk section 11 and a hard disk controller (HDC) 30 provided with a local CPU. The disk section 11 is provided with a disk drive unit 14 which spins a shaft 12 at high speed. The shaft 12 has a cylindrical support body 16 attached thereto so that the axes thereof are vertically aligned with each other. One or more data recording disks 18A and 18B are mounted on the outer peripheral surface of the support body 16 at predetermined intervals. If the shaft 12 is rotated by the disk drive unit 14, then the disks 18A and 18B will be rotated together with the support body 16.

Signal converters 20A, 20B, 20C, and 20D are supported and arranged by access arms 22A, 22B, 22C, and 22D so that they are opposed to corresponding disk surfaces. The access arms 22A, 22B, 22C, and 22D are attached to a signal converter drive unit 28 through a shaft 24, and if the drive unit 28 rotates, the access arms will be positioned over predetermined positions on the disk surfaces. The disk drive unit 14 and the signal converter drive unit 28 are connected to the HDC 30 so that the number of rotations and the speed are controlled. The HDC 30 is connectable to a host.

The magnetic disk, such as a hard disk and a flexible disk, is formed with a plurality of concentric circular data tracks. The data reading or data writing with respect to the magnetic disk is performed after the magnetic disk is rotated and also after the magnetic head is moved along the radial direction of the magnetic disk to position it over a specific data track (seek operation). The positioning of the magnetic head over the specific data track is performed by reading out head position identification data and burst patterns prerecorded on the magnetic disk with the magnetic head, as will be described next.

Figure 2:
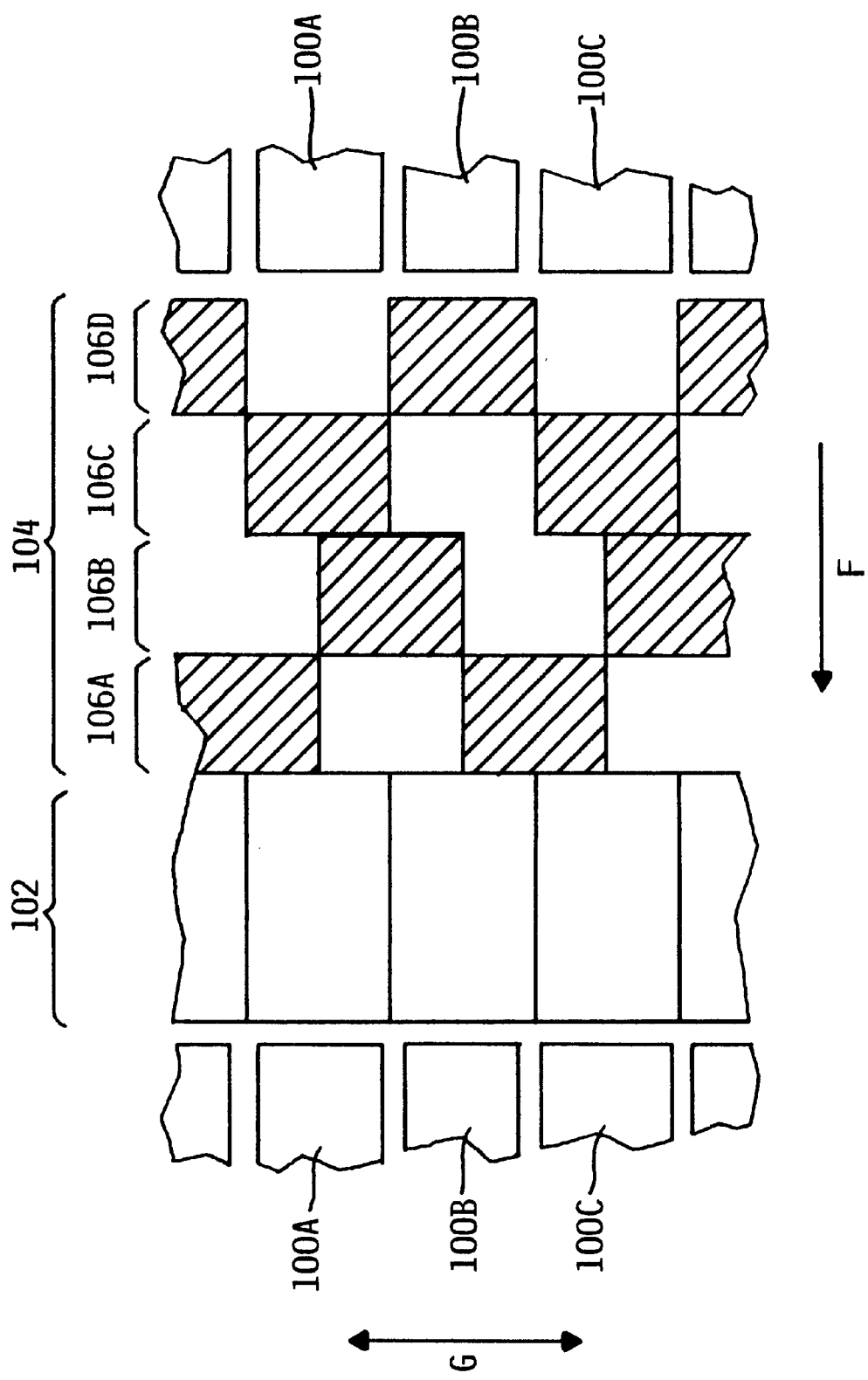
FIG. 2 is a diagram showing the servo area recorded on the magnetic disk of the hard-disk drive.

FIG. 2 shows some of the pieces of head position identification data and some of the burst patterns, which are recorded on the magnetic disk. In FIG. 2, the magnetic disk rotate s in its circumferential direction (indicated by arrow F), and a magnetic head (not shown) moves along the radial direction (indicated by arrow G) of the magnetic disk where a plurality of data tracks (100A, 100B, 100C . . . ) are concentrically formed. Each of the data tracks is divided along the circumferential direction, and between adjacent data tracks divided in the circumferential direction, there is formed an identification data recorded area 102 and a burst pattern recorded area 104.

Each data track is given in advance a track address for identifying each data track. Predetermined bits of identification data, which represents the track address of a data track in terms of a Gray code (cyclic binary code), have been recorded on the above-described identification data recorded area 102 along the circumferential direction in correspondence with each data track. Also, on the burst pattern recorded area 104 there have been recorded a plurality of burst pattern rows (in FIG. 2, 106A, 106B, 106C, and 106D) where signal recorded areas (hatched portions in FIG. 2) are arranged in the radial direction.

When the magnetic head is positioned over a predetermined data track, the magnetic disk is rotated and also the magnetic head is moved along the radial direction of the magnetic disk, as described above. Then, based on an identification data read signal which is output from the magnetic head each time the identification data recorded area 102 corresponds to the magnetic head by the rotation of the magnetic disk, the track address of the data track corresponding to the magnetic head is computed as a current position of the magnetic head. The recording length of one bit of data for identification data has been determined in advance, and identification data has been recorded so that the position of the portion which is magnetized to an N pole or S pole, corresponding to each bit, becomes different in accordance with whether the value of each bit of the Gray code representative of a track address is 0 or 1.

Figure 3A:
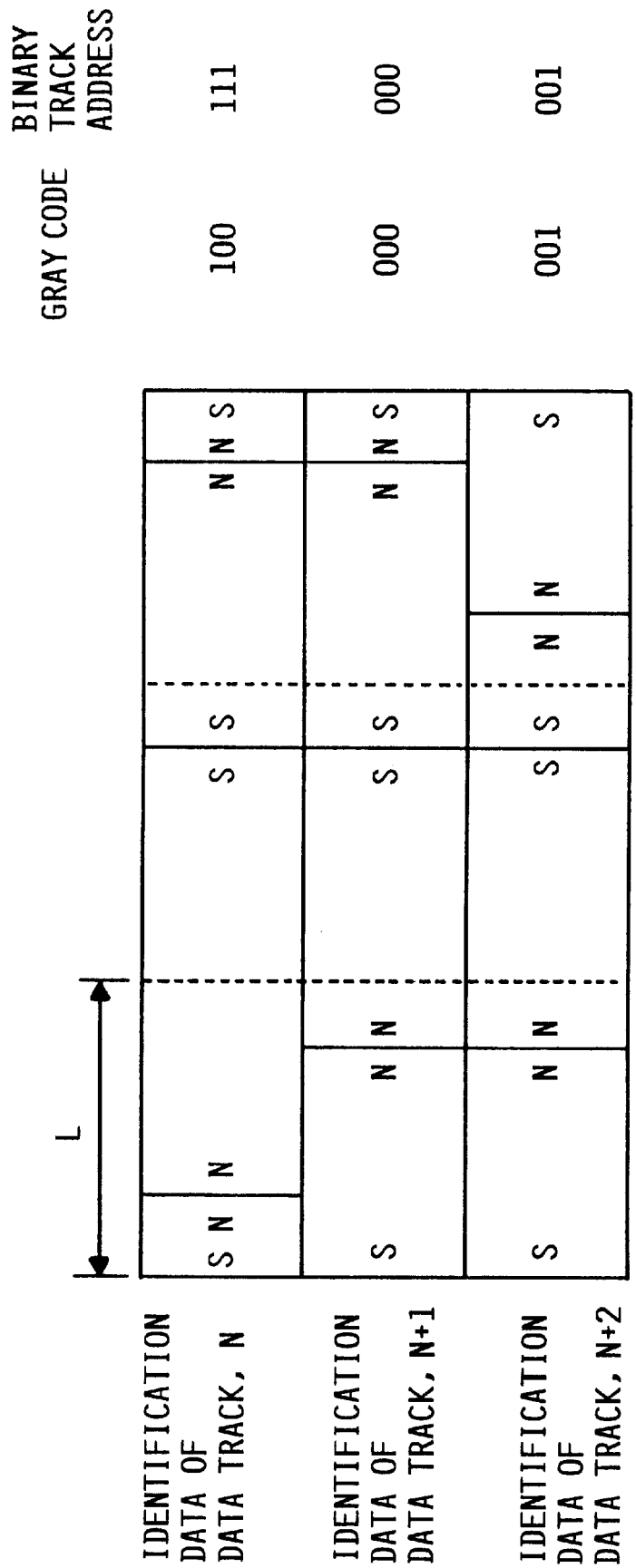

For example, if the magnetic head passes through the identification data recorded area of the data track N shown in FIG. 3(A), then a pulse will occur as an identification data read signal at the portion magnetized to an N pole or S pole, as shown in FIG. 3(B), and a signal corresponding to that pulse will be output from the magnetic head. Likewise, if the magnetic head passes through the identification data recorded area of the data track N+1 shown in FIG. 3(A), then a pulse will occur as an identification data read signal at the portion magnetized to an N pole or S pole, as shown in FIG. 3(C), and a signal corresponding to that pulse will be output from the magnetic head. Based on the positions of the pulses of these identification data read signals, the value of the Gray code, which has been recorded on the identification data recorded area 102 as identification data, can be identified, and the track address can be obtained by converting the identified Gray code into a binary code.

From the pulses of FIG. 3(B), a Gray code (100) is read out and a binary code (111) converted is obtained. From the pulses of FIG. 3(C), a Gray code (000) is read out and a binary code (000) converted is obtained.

If it is judged that the magnetic head has corresponded to its target data track, then a position detection signal whose level linearly changes according to the position of the magnetic head will be generated based on a plurality of signals, which are obtained by reading out each of the burst pattern rows of the burst pattern recorded area 104 with the magnetic head. Based on that position detection signal, the magnetic head is positioned so that the center of the element of the magnetic head is aligned with the center of the width direction of the target data track.

Incidentally, magnetic disks have the problem that read errors are caused by a medium defect or electrical noise. Recently disk drives using a magneto-resistive (MR) element head as a read element are becoming the focus of attention as a large capacity disk drive. The disk drive using this head is confronting a new problem of a read error resulting from a thermal asperity. The MR element is an element which senses a change of magnetization, which is data written to a disk, and reads out this change as a change in an electric resistance (using an MR effect).

The thermal asperity is the roughness of the disk surface produced for various causes, for example, small dust particles and corrosion. The roughness of the disk surface touches the structure of a head having an MR element and causes the temperature of the MR element to rise. As a result, a change in the resistance causes an occurrence of a read error. For the errors that occurred in the data area, the recovery of the errors is usually executed by adding signals having an error correction function (for example, error correction code (ECC)) to the errors. However, an error correcting method in the servo area is insufficient, and if the ECC is added to the servo area in a manner similar to general data, the number of overhead bits, which are data other than user data, will be increased and this increase will not meet the large-capacity requirement. Also, a measure to correct an error by extending the servo area and continuously writing in servo data twice can be considered, but this measure also increases the number of overhead bits. Further, in the case of an occurrence of an error in continuous areas, this measure cannot be an effective error recovering function.

The present invention aims at providing the structure of a servo signal where a read error resulting from the thermal asperity, produced particularly in an area between a servo pad and a Gray code, is prevented and where accurate servo data can be obtained.

The Gray code is recorded at a position following an erase area, which is a no-signal section serving as servo identification representative of the start position of servo data, and the Gray code has the cylinder position data and sector position data of a current track position. Following this Gray code, a servo wedge is recorded. The servo wedge consists of servo patterns providing a signal for fine adjustment of a head position to a track.

Figure 4A:
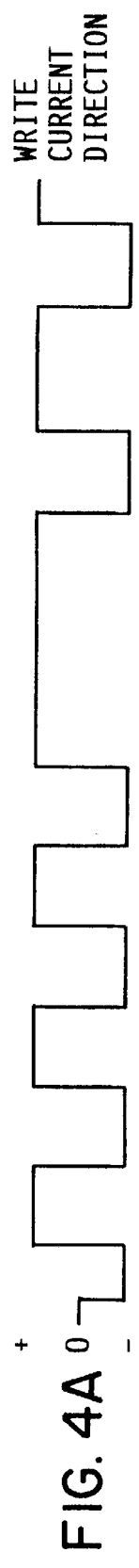
FIGS. 4(a) to 4(d) are a diagram showing the signal pattern in the servo area, the read signal input waveform, and the peak detected waveform obtained from the input waveform.
Figure 4B:
Figure 4C:
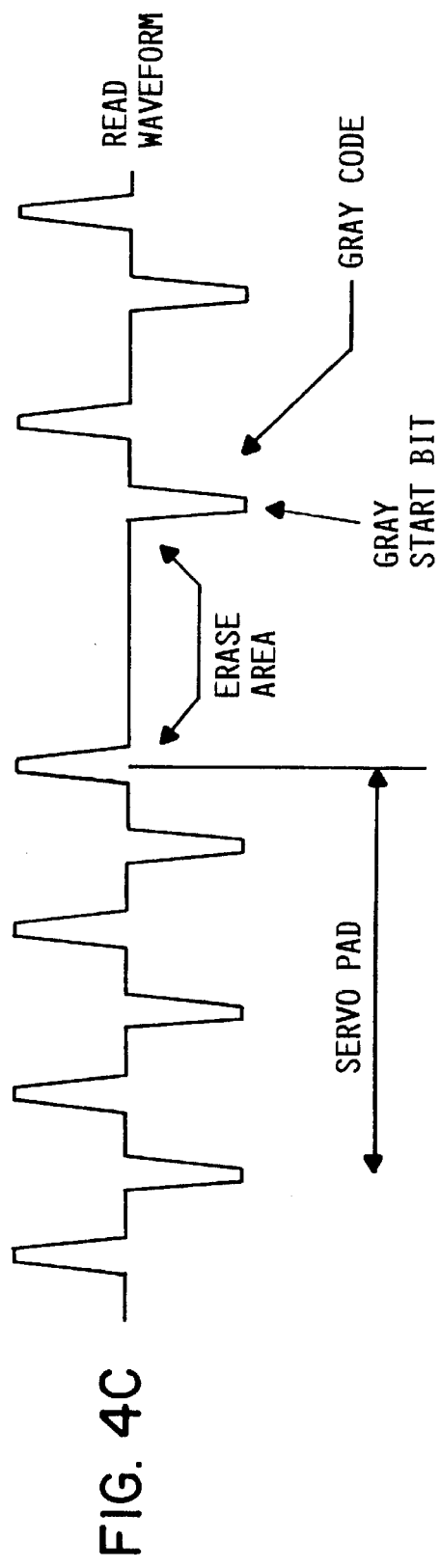
Figure 4D:

The write pattern of the servo signal, together with the write signal thereof, will be described in FIGS. 4(a) to 4(d). FIG. 4(a) is a waveform diagram of the direction of a write current for writing a servo signal, and FIG. 4(b) shows the state of the magnetization of the disk written by that write current. FIG. 4(c) shows the read waveform of the magnetized disk, and FIG. 4(d) is a diagram showing the signal areas on the disk.

Figure 5A:
FIGS. 5(a) to 5(c) are a diagram showing the servo area where data has been written.
Figure 5B:
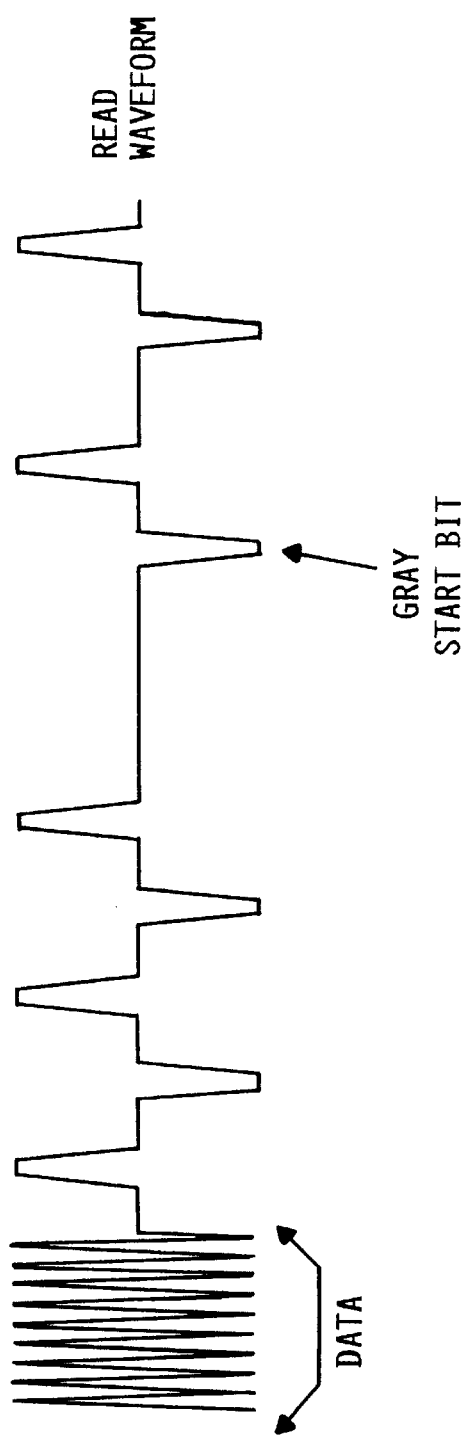
Figure 5C:

As will appreciated from these figures, NS patterns are regularly recorded on the servo pad area, and thereafter a no-signal area (where a direction of magnetization is unchangeable) is formed in the erase area. Thereafter, as a servo Gray code area, substantial servo data (for example, track number) is written in. These servo data are written in before data is written in, and thereafter, data is written to areas other than the servo areas. FIGS. 5(a) to 5(c) show the state that data have been written in. As shown in FIGS. 5(a) to 5(c), data are written in the first half portion of the servo pad area, and the second half portion is remained as the servo pad area. Therefore, a data area, a servo pad area, an erase area, and a servo Gray code area are maintained in the recited order. The first effective signal occurring after the erase area represents the start point of the Gray code representative of substantial position data. This first signal is called a Gray start bit and declares the start of the Gray code, and the system side is informed of the start of the track data.

The reading of the signals recorded on the disk is performed by alternately detecting and reading out positive and negative peak signals different from each other. In other words, an alternately reading method using a hysteresis comparator has been widely used. Therefore, a negative signal is detected after a positive signal is detected and read out, and conversely, after a negative signal, a positive signal is searched and detected. Therefore, it is necessary that the end signal of the servo pad area and the start bit signal of the Gray code area be opposite in polarity. When servo data are written in, servo patterns of this structure are made so that the Gray start bit can be recognized.

If, however, the above-described thermal asperity occurs in the erase area between the servo pad and the Gray code, there will be some cases where the start bit of the Gray code cannot be read out, and cases erase area cannot be detected.

Figure 6:
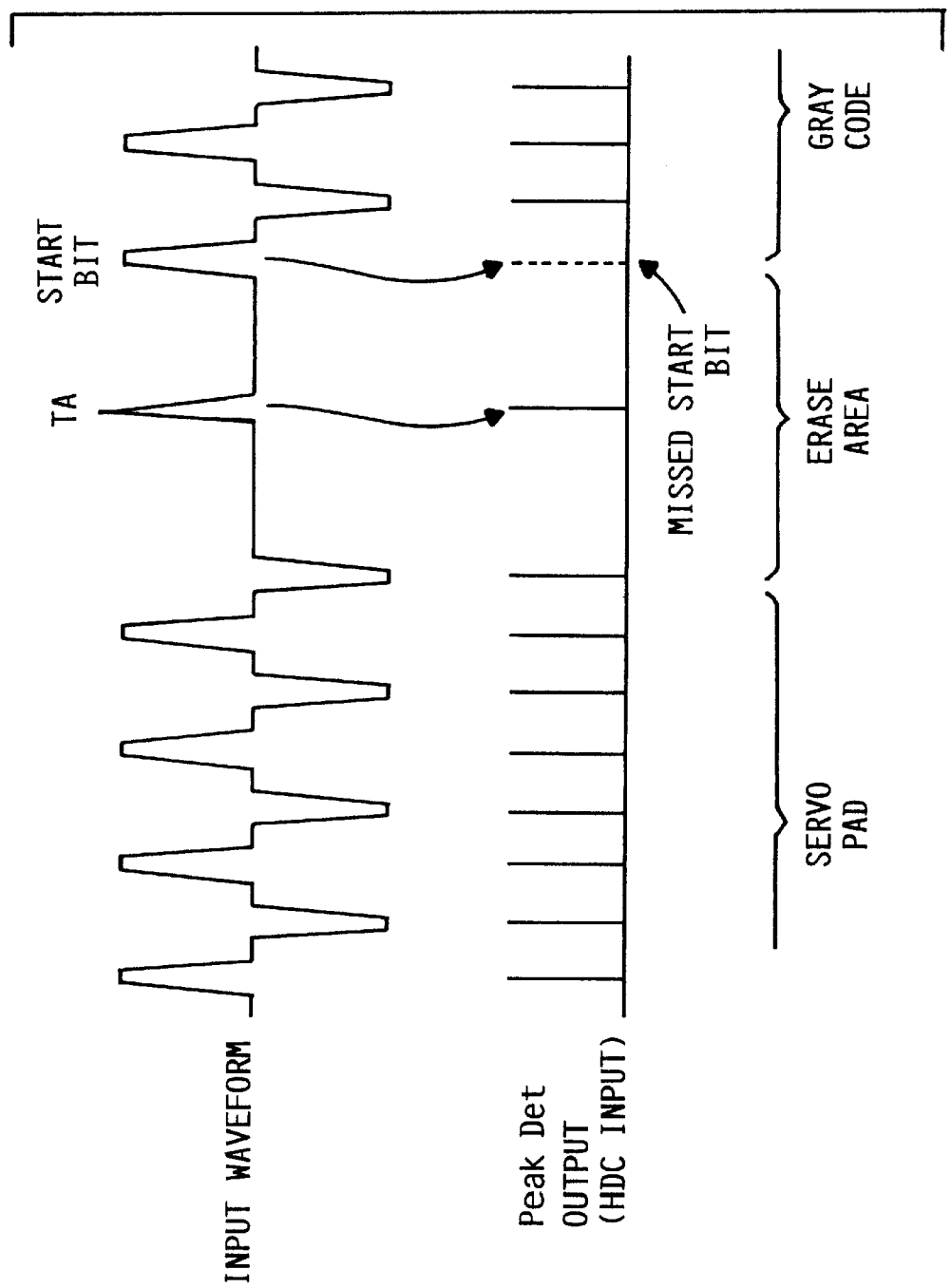
FIG. 6 is a diagram showing the signal pattern area in a conventional servo area where a thermal asperity has occurred, the read signal input waveform, and the peak detected waveform obtained from the input waveform.

This state is shown in FIG. 6. In a case where a thermal asperity (TA) occurs in the erase area shown in FIG. 6 and the read waveform of this thermal asperity and the read waveform of the end bit of the servo pad are opposite in polarity, the signal caused by the thermal asperity is detected to be the start bit of the Gray code by a peak detecting circuit provided in a channel. If this read error occurs, then the following servo area and the data area following this will not be able to be used.

Figure 7:
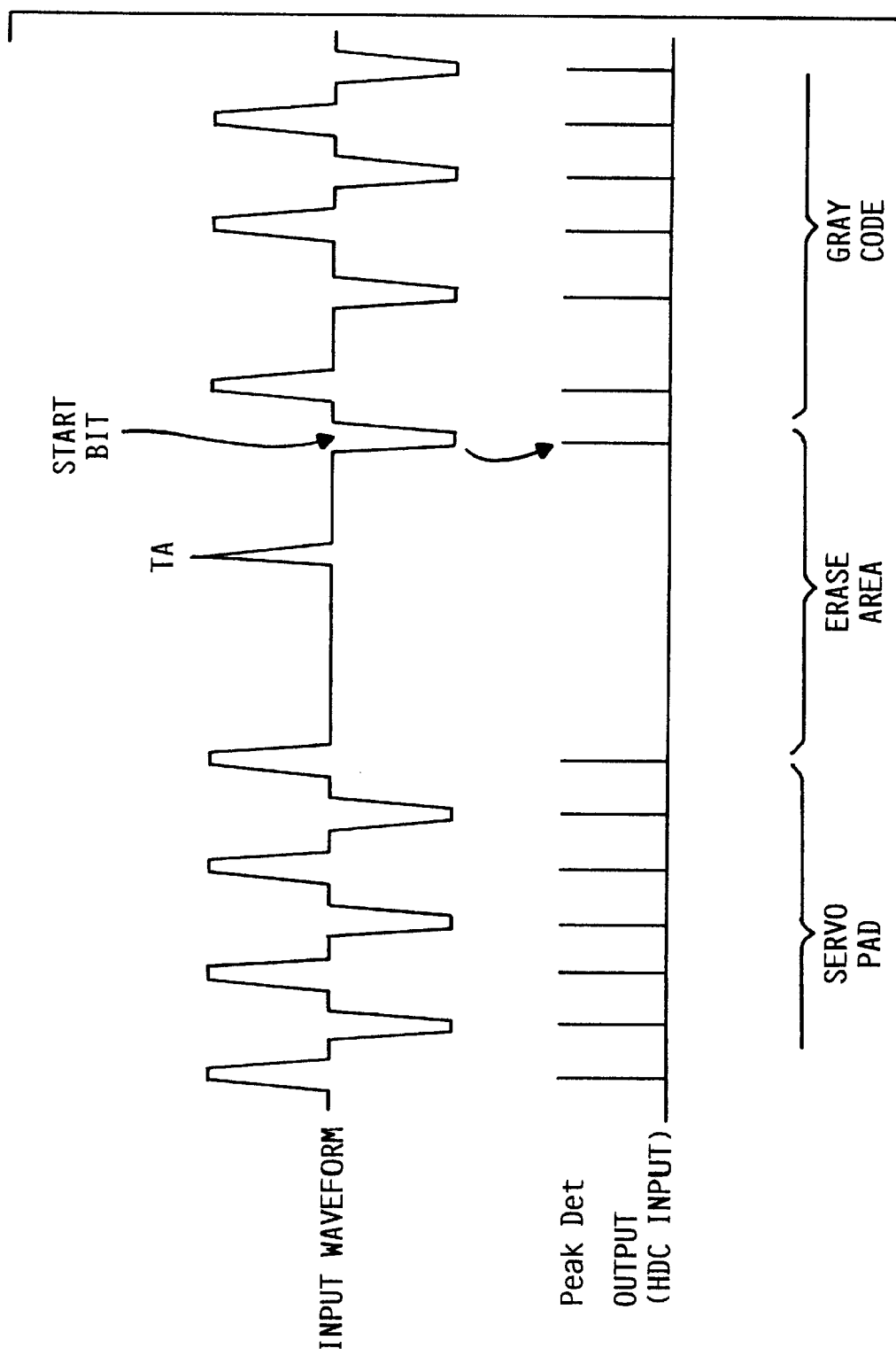
FIG. 7 is a diagram showing the signal pattern area in the servo area of the present invention where a thermal asperity has occurred, the read signal input waveform, and the peak detected waveform obtained from the input waveform.

The present invention has been made in order to prevent a case such as this. The structure is shown in FIG. 7. The present invention is constructed so that the polarity of the end output signal of the servo pad and the polarity of a signal caused by the thermal asperity (TA) become the same. In other words, the polarity of the start bit of the Gray code and the polarity of a signal caused by the thermal asperity (TA) are opposite. If a signal form such as this is taken, since the end signal of the servo pad and the following signal caused by the thermal asperity are the same polarity, the signal of the thermal asperity will not be detected by the above-described alternate polarity reading method using a hysteresis comparator, and the following start bit of the Gray code can be accurately read out.

The polarity of a signal read out with the MR head is determined by whether an increase or decrease in the resistance of the MR element is output as a positive or negative polarity, and a read amplifier associated with the MR element is to be concerned. The increase and decrease in MR element resistance by the magnetic field NS on a magnetic disk are determined by whether the magnetic field recorded on the disk acts in the direction increasing the bias angle or in the direction decreasing the bias angle, with respect to the bias magnetic field given to the MR head. Therefore, whether the NS signal of the disk becomes positive or negative varies according to the structure of the bias magnetic field of the head.

However, the thermal asperity occurs when the roughness of the disk touches the structure of a head having an MR element, as described above. This touch causes the temperature rise of the structure, and a change in the resistance of the MR element caused by the temperature rise is unitary. In other words, the resistance of the MR element is increased as temperature rises. It has been found that the change of the resistance value of the MR element exhibits a form of change substantially similar to the temperature change of the element.

Therefore, a pattern such as that shown in FIG. 7 can be realized by making the polarity of the signal caused by a resistance increase resulting from the temperature rise of the MR element identical with the polarity of the end signal of the servo pad, in other words, by writing in the magnetic poles of servo signals so that the polarity of the start bit of the Gray code becomes the reverse of the polarity caused by a resistance increase resulting from the temperature rise of the MR element.

As an example, consider a case where the bias magnetic field of the MR element is applied as shown in FIG. 8. Assuming that a bias magnetic field has been applied to an MR element 50 shown in FIGS. 8(a) and 8(b) in an arrow direction 52 indicated by solid line, i.e., in a direction of about 45 degrees upward from a disk 58 and that, as shown in FIG. 8(a), the magnetic field of a disk 58 is an N pole, then the direction of the magnetization of the MR element will change upward as shown by broken-line arrow 54. The resistance of the MR element at that time changes in a decreasing direction. The output signal obtained at that time is defined as positive. Conversely, if the magnetic field of the disk 58 is S, as shown in FIG. 8(b), then the direction 52 of the magnetization of the MR element will change toward the disk, as shown by broken-line arrow 56 in FIG. 8(b). The resistance change at that time is the reverse of FIG. 8(a) and the resistance increases. Therefore, the output becomes negative.

In this case, since the influence of the thermal asperity is an increase in the resistance of the MR element, a negative signal is to be output. Therefore, in the case of a structure where the above-described bias magnetic field exists and positive and negative signals are output as described above, if servo signals are written in so that the polarity of the end output signal of the servo pad becomes negative and the polarity of the start bit of the Gray code becomes positive, then there will be no possibility that a negative signal caused by the thermal asperity is read out by mistake.

When, in contrast with FIGS. 8(a) and 8(b), the direction of the bias magnetic field of the MR element is inclined at an angle of about 45 degrees toward the disk direction, i.e., in the downward direction, the polarities of signals to be obtained are the reverse of the case of FIGS. 8(a) and 8(b), so it is necessary that the signal of the servo pad and the start bit of the Gray code are constituted with the reverse magnetization pattern. In either case, the signal caused by the thermal asperity is the signal caused by the resistance increase of the MR element. Therefore, in a case of a system where the signal caused by the resistance increase of the MR element is negative, a servo pattern needs to be so written as to obtain a pattern of magnetization where the start bit signal of the Gray code is a signal of positive polarity. On the other hand, in a case of a system where the signal caused by the resistance increase of the MR element is positive, a servo pattern needs to be so written as to obtain a pattern of magnetization where the start bit signal of the Gray code is a signal of negative polarity.

In a case of a disk drive which has a plurality of MR elements and has a plurality of signal recording disk surfaces corresponding to the MR elements, if the respective MR elements and the magnetization pattern of the servo area of each disk surface are set as described above, the prevention of the read error of the start bit will become possible in all cases, such as a case where a plurality of disks are used, or a case where both sides of a disk are used.

In accordance with the present invention, there is no possibility that the thermal asperity appearing in the erase area of the servo area which is the position data of a magnetic head to a disk is read out as the start bit of a Gray code by mistake, and therefore the present invention is applicable to a measure to compensate a thermal asperity.

We claim:

1. A disk drive which has a magneto-resistance (MR) element as a read element and where servo areas, which include position data, and data areas are separated and recorded on a disk and each of said servo areas has a servo pad area at the start position of the servo area, also has an erase area which is a no-signal portion, immediately after and adjoining said servo pad area, and further has a Gray code area where track position data of the disk has been recorded, immediately after and adjoining said erase area, said disk drive comprising:

a combination of the disk in which a servo signal pattern has been formed and the MR element where the direction of the bias magnetization thereof has been set, in such a manner that a polarity of a start bit recorded signal of a start position of said Gray code area, which is detected by said MR element, is a polarity opposite to a polarity indicated by a resistance increase of said MR element due to a thermal asperity; and means for executing a reading of a signal by a method of alternately reading out signals different in polarity.

2. A disk drive as recited in claim 1, wherein a polarity of an end bit recorded signal of an end position of said servo pad area, which is detected by said MR element, is a polarity the same as said polarity indicated by said resistance increase of said MR element and opposite said polarity of said start bit recorded signal of said start position of said Gray code area.

3. A servo pattern write method for a disk drive which has a magneto-resistance (MR) element as a read element and where servo areas, which include position data, and data areas are separated and recorded on a disk, said servo pattern write method comprising the steps of;

writing a servo pad area at the start position of each of said servo areas;

writing an erase area which is a no-signal portion, immediately after and adjoining said servo pad area; and writing a Gray code area where track position data of the disk is recorded, immediately after and adjoining said erase area, wherein a pattern of magnetization is written in so that a polarity of a start bit signal written at a start position of said Gray code area, which is detected by said MR element, is a polarity opposite to a polarity of a signal caused by a resistance increase of said MR element due to a thermal asperity.

4. A servo pattern write method as recited in claim 3, wherein said step of writing a servo pad area includes the step writing a pattern of magnetization so that a polarity of an end bit recorded signal of an end position of said servo pad area, which is detected by said MR element, is a polarity the same as said polarity indicated by said resistance increase of said MR element and opposite said polarity of said start bit recorded signal of said start position of said Gray code area.

* * * * *